United States Patent
Leach

(10) Patent No.: US 6,960,065 B2
(45) Date of Patent: Nov. 1, 2005

(54) AERODYNAMIC ARTICLE WITH PROTECTIVE COATING AND METHOD OF BONDING METAL TO POLYURETHANE

(75) Inventor: Roger Leach, Darwin, NJ (US)

(73) Assignee: Leach Aero Services Pty. Ltd., Northern Territory (AU)

( * ) Notice: Subject to any disclaimer, the term of this patent is extended or adjusted under 35 U.S.C. 154(b) by 0 days.

(21) Appl. No.: 10/471,453

(22) PCT Filed: Mar. 11, 2002

(86) PCT No.: PCT/AU02/00275

§ 371 (c)(1),
(2), (4) Date: Sep. 12, 2003

(87) PCT Pub. No.: WO02/072420

PCT Pub. Date: Sep. 19, 2002

(65) Prior Publication Data

US 2004/0096331 A1 May 20, 2004

(30) Foreign Application Priority Data

Mar. 14, 2001 (AU) .............................................. PR3739

(51) Int. Cl.$^7$ ............................................... F04D 29/38
(52) U.S. Cl. .............................. 416/229 R; 416/241 A; 415/200
(58) Field of Search ........................ 416/229 R, 241 A; 415/200; 427/270; 428/201.1, 300.1, 331, 413, 425.5, 425.9, 698

(56) References Cited

U.S. PATENT DOCUMENTS

| 4,318,672 A | * | 3/1982 | Hansen ........................ 416/224 |
| 4,492,522 A | * | 1/1985 | Rossmann et al. ...... 416/241 R |
| 5,123,814 A | * | 6/1992 | Burdick et al. ............. 416/224 |
| 5,145,320 A | * | 9/1992 | Blake et al. ................. 416/230 |
| 5,344,235 A | * | 9/1994 | Weetman et al. ........ 416/236 A |

FOREIGN PATENT DOCUMENTS

| DE | 32 17 172 A1 | 12/1983 |
| FR | 1 349 383 | 4/1974 |
| GB | 2 047 188 A | 11/1980 |

* cited by examiner

*Primary Examiner*—Edward K. Look
*Assistant Examiner*—Igor Kershteyn
(74) *Attorney, Agent, or Firm*—Simpson & Simpson, PLLC

(57) ABSTRACT

To protect an article with an aerodynamic surface, such as an aeroplane propeller or helicopter rotor, from erosive damage caused by flying particulate matter, a thin elastomeric protective covering is provided. This layer covers approximately 15% of a forward face (15) a leading edge (12), and approximately 90% of the rear face (13) of the article. Typically, it is made of polyurethane with hardness between 85 Shore A and 80 Shore D. It is applied by centrifugal casting using a silane log gammaglycidoxporpyl-trimethoxysilane as a coupling agent when bonding to a metal surface such as aluminum.

25 Claims, 1 Drawing Sheet

AERODYNAMIC ARTICLE WITH PROTECTIVE COATING AND METHOD OF BONDING METAL TO POLYURETHANE

FIELD OF THE INVENTION

The present invention is particularly concerned with blades used as rotor blades in helicopters and propeller blades for aeroplanes.

The invention also relates to other articles used in aerodynamic applications and has further application in fluid mechanics.

For convenience the preferred embodiment of the invention will be described having regard to rotor or propeller blades, but the invention is not restricted to these applications.

BACKGROUND OF THE INVENTION

For aeroplanes having propeller blades, the leading edges of the propeller blades can suffer significant erosion over a short period of time. This erosion is exacerbated when the aeroplane uses unsealed airstrips for landing and take off. The main cause or erosion of propeller blades is the airborne dust and gravel which tends to strike the leading edges and rear faces of the propeller blades. This problem can lead to a drastic reduction in the life span of propeller blades and therefore increases the running costs of aeroplanes which have propeller blades.

When a propeller blade is damaged it normally has to be completely replaced at considerable cost. The present invention is aimed at providing a method of protecting rotor and propeller blades and the like as well as repairing such articles when damaged.

SUMMARY OF THE INVENTION

According to the present invention there is provided an article having an aerodynamic surface with a portion having a protective covering thereon which is adapted to provide resistance to wear, the portion being that part of the aerodynamic surface which is prone to erosion from particulate matter when in use, wherein the protective covering comprises an elastomer such as a polymeric substance which is bonded to the portion.

According to another aspect of the present invention there is provided a blade or wing having a portion with a protective covering thereon, the portion including a minor forward face portion, an end edge portion and a major rearward face portion.

Preferably the covering comprises a layer bonded to the portion.

It is generally expected that the blade or aerodynamic surface is metal or a metal composite.

Preferably the minor forward face portion extends from the outermost 15% of the length of the forward face edge of the blade.

The end edge portion may extend from the forward face to the rearward face portion.

The major rearward face portion preferably extends along at least 99.5% of the length of the rearward edge of the blade.

A protective covering preferably extends from the top face of the blade to the bottom face of the blade.

The protective covering may be in the form of a coating.

Preferably the protective covering comprises a polymeric or plastics material.

The protective covering may be rubber 90 duro polyurethane.

The end edge portion preferably comprises approximately 6% of the major length of the propeller as measured from the outermost tip inwardly.

The end edge portion may taper towards the front and rearward face portions.

Preferably the end edge portion comprises the leading edge and has a convex arcuate shape.

The forward portion preferably extends from the forward most edge of the blade.

The top profile preferably shows the portion is thickest at the leading edge and tapers in thickness to forward and rearward face portions.

According to another aspect of the present invention there is provided a method of covering a portion of a metal surface comprising the steps of treating the surface of the portion with a silane coupling agent to allow bonding of a polyurethane substrate thereto, applying a polyurethane prepolymer to the treated surface of the portion and polymerising the prepolymer, whereby the polyurethane substrate is bonded to the surface of the portion.

The article is preferably a blade of a propeller, rotor or impellor or the like.

The article is preferably placed in a mould and the mould is placed in a centrifuge which is operated to set the polymeric substance in the mould.

It is preferred that the centrifuge is adapted to substantially eliminate bubbles from the cured polymeric substance.

Typically the silane coupling agent is gamma-Glycidoxypropyltrimethoxysilane.

Typically the silane is applied as an aqueous solution, preferably a 2% aqueous solution.

The polyurethane substrate is preferably 90 duro polyurethane.

The words "comprising, having, including" should be interpreted in an inclusive sense, meaning that additional features may also be added.

BRIEF DESCRIPTION OF THE DRAWINGS

A preferred embodiment of the present invention will now be described by way of example only with reference to the accompanying drawings in which.

DETAILED DESCRIPTION OF THE DRAWINGS

Figure 1:
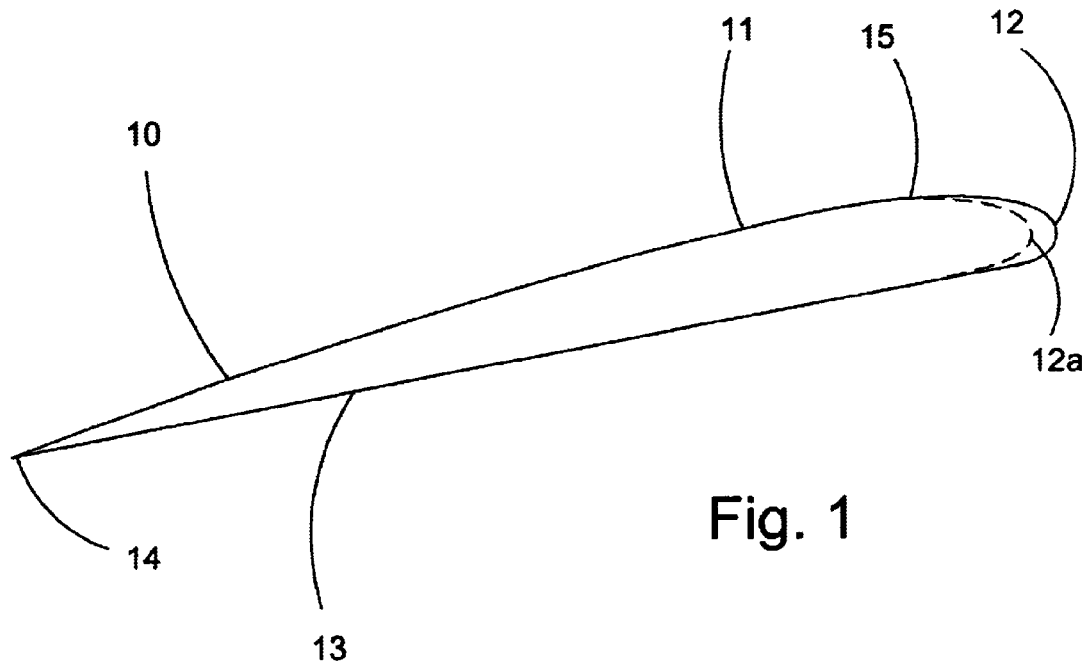
FIG. 1 shows a first top view of a propeller blade according to the preferred embodiment of the invention.

A propeller blade 10 according to the preferred embodiment has an elongate arcuate shape with a forward edge 11, outer edge 12 and rearward edge 13.

The blade 10 increases in thickness gradually from the inner end 14 and has a maximum thickness around a location approximately 85% of the length of the blade 10.

It has been found that for an aluminium blade wear to the blade occurs around the 15% mark of the forward face as indicated by item 15 and extends around the outermost edge 12 along all of the rearward edge 13.

It is noted however that close to the inner end of blade 10 (item 14) minimum erosion takes place.

The amount of erosion 12a which occurs is generally at a maximum around the outer edge 12 and tapers off gradually to the forward edge identified by item 15 and to a point approximately 90% of the length of the rear face of the blade 10.

From the 90% mark of the rear face 13, wear tends to be constant along the whole of the rear face edge 13.

It is noted that the amount of wear 12a of the outermost edge 12 tends to be around 5 mm of erosion.

Figure 2:
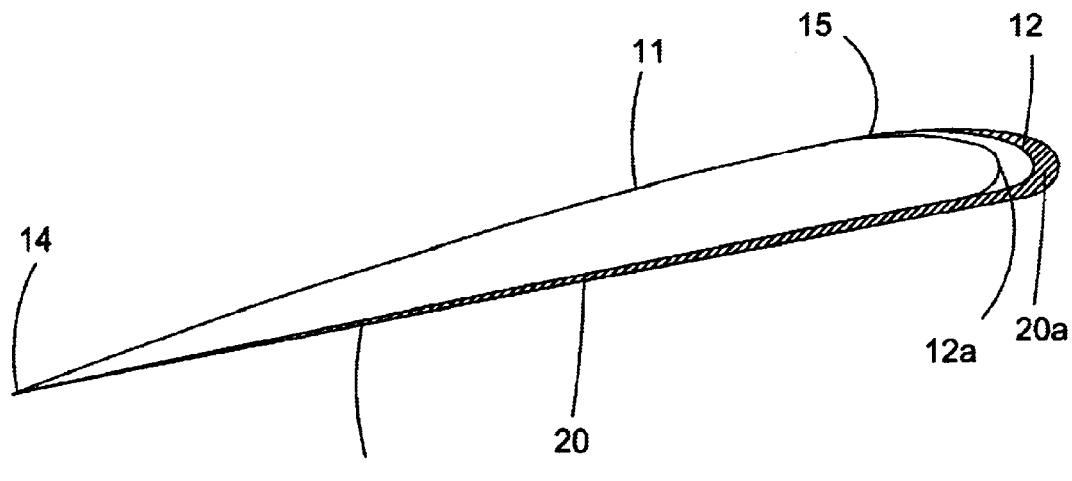
FIG. 2 shows a front view of the propeller blade shown in FIG. 1.

As shown in FIG. 2, to prevent or substantially mitigate the effects of erosion to primarily aluminium blades, an elastomer such as a rubber polymeric coating 20 is applied to the outer edge 12 of the blade 10 as well as the rear face edge 13 and the outermost part of the forward face 15.

At the inner end 14 of the propeller the elastomer coating 20 is of a thickness of between 0 and 0.5 mm and at the outer edge portion of trailing edge 13 of the blade 10 the thickness of the coating is between 1 and 2 mm.

The leading edge 12 is contoured so that its maximum coating thickness 20a at the apex of the propeller 10 is up to 6 mm for larger blades and as low as 1 mm for smaller blades. It is important that the coating at the leading edge 12 of the propeller 10 is contoured to the shape of the metal part of the propeller 10 so that an aerodynamic foil surface is provided. Accordingly on either side of the apex of the leading edge 12 the thickness of the coating 20 diminishes. As shown in FIG. 2 on the forward face of the propeller 10 the coating 20 extends towards the inner end approximately 0.15 of the overall length of the propeller 10. Alternatively the coating 20 may be applied all the way back to the trailing edge 13 in order to avoid any abrupt step from the coating to the surface of the propeller 10. In certain circumstances it may be as much as 0.25 of the length of the propeller.

It is important that the propeller be provided with the coating described above in order to provide maximum wear resistance against erosion.

According to the preferred embodiment this is achieved using a centrifugal application process that also encompasses other application processes followed by a machining process to the preferred thickness.

It in also noted that if a new propeller is made a coating may be applied over the whole propeller as long as the leading edge and/or rearward edge coating characteristics are in accordance with those described above.

As an alternative the blade may be repaired in the following manner.

Firstly any damage is blended out and the blended blade is checked against propeller manufacturer specified minima. Checks are performed for twists, bends and distortions to ascertain whether any dimensional deviation from the manufacturers is within the allowed limited.

The next step is to prepare the bonding surface of the propeller blade and this is followed by providing a silane treatment of the bonding surface.

Next the blade is placed in a mould and the mould is placed in a centrifuge.

It is preferred that the blade is placed with its length parallel to a central longitudinal axis of the centrifuge. Thus when the centrifuge is operated the blade rotates in the same manner as a blade in a paddle steamer paddle wheel. This substantially eliminates any bubbling occurring in the polyurethane rubber thus providing a smooth finish to the exterior surface of the polyurethane rubber when sat.

A polyurethane rubber is then mixed and placed in the mould header and centrifuging is then initiated.

The mould and blade is then removed from the centrifuge and oven curing of the mould blade is initiated followed by stripping of the mould after curing.

The final step is removing the mould flash, final finishing and painting of the blade.

A detailed outline of the above procedures is set out below.

Damage Blend Out

Paint strip and clean the blade using standard phenolic paint stripper, Turco 5351. Consult the product data sheet for Turco 5351 to ensure that safety precautions are observed when using this stripper.

Blend out all damage to the blade in accordance with propeller manufacturers data and ensure that the blended blade still meets manufacturer's dimensional requirements. Effect mechanical repairs, for example, straightening as permitted by the manufacturer.

Finish blended surfaces with 320 grit emery paper.

Wash the blade with new MEK (Methyl-Ethyl-Ketone, Aircraft Grade) wipe clean with new industrial tissues. Repeat this Procedure using new MEK and changing tissues until tissues come up clean. Ensure that safety precautions are followed when using this compound.

Surface Preparation

Obtain rectangular test specimen. From this point on the test specimen goes through the same processes at the same time, as the blade.

Scrub the area to which the rubber is to be bonded using Scotchbrite "A" pads and town water. Scrub in one direction along the blade until all scrub lines lie along the blade and until a water break is achieved, that is, until the complete surface is wetted.

Repeat this process at right angles to the blade until all former scrub lines are removed and the new scrub lines are at right angles to the blade.

Repeat this process now scrubbing along the blade.

Dry the surface with low pressure nitrogen gas, starting from one end, sweeping around the blade and moving from one end of the blade to the other such that the blade is dried with residual moisture being blown off one end.

When completely dry, repeat steps 4.2 through 4.5 using new pads and distilled water. Gloves must be worn throughout this step and after drying, the bond area must not be handled.

Silane Treatment of Bond Surface

Prepare a 2.0% by weight aqueous solution of silane coupling solution (union Carbide A-187) with distilled water. This solution must be thoroughly mixed making sure that the silane is completely in solution and not coating the surface of the mixing beaker. Mixing must be performed in a clean glass tray. Record shelf life, ambient temperature, humidity and batch number on worksheet.

Caution

Silane must be decanted under a nitrogen shield and container must be immediately sealed after decanting. Ensure that when decanting the silane that it does not have a milky appearance, such an appearance will be cause for rejection.

Let the silane solution sit in the mixing tray for 1.0 to 1.5 hours.

Again repeat steps 4.1 through 4.4, this time using the silane solution and a fresh Scotchbrite pad. Hands must be clean gloved. Again scrubbing directions must be along and across the blade with the final scrub at 45° to these two directions and the surface must be fully wetted when complete (i.e. no water break).

Again blow dry with nitrogen. Be sure not to touch the bond surface thus prepared either with the hand or any other object.

Place the blade in a hot air box 70±5° C. for 10 minutes.

Discard silane—water mixture after use.

Fixing the Blade to Mould and to Centrifuge.

Make sure that the mould inner surfaces, riser passages, vents, sprues etc, are clean.

Clamp the blade into the mould and connect the mould to the Centrifuge.

Using clean new tubing, connect the mould feeder port to the reservoir. Connect the mould vent port to the port at the top of the reservoir.

Check the centrifuge balance by holding the blade support arm in the horizontal direction. Balance the arm as required by adjusting the balance weights. Give the centrifuge a short run to ensure that balance is reasonable.

Mixing and Placing Polyurethane

Preheat the polyurethane container to 70±3° C. so that the polyurethane can be poured from the container. Polyurethane used is Erapol E90A.

Erapol E90A is a polyurethane having particular characteristics which make it suitable as a coating to a propeller blade. For example it is 90 duro, has good resistance to sunlight and is silane connectable. Reference is made to a brochure produced by Era Polymers Pty Ltd of 25–27 Green Street, East Botany, New South wales 2019, Australia. The brochure is entitled "A flew Era in Polyurethanes".

It is preferred that the elastomer used in the present invention has a hardness of 85 Shore A to 80 Shore D.

Typically Erapol E90A has an abrasion resistance of just under 100 TS/mg per cycle. An abrasion resistance of greater than 85 is preferred for the elastomer used. These taper abrasion results are based on the use of an H-18 wheel based on 500 cycles.

Reference may be made to the brochure described above for other polymers which have suitable hardness and abrasion characteristics.

It is noted that a selection of a material which has the proper hardness characteristics has a high priority as a product which is too soft will not maintain its aerodynamic properties because it will be too flexible. Accordingly once an elastomer with the correct hardness characteristics is chosen its abrasion characteristics can be obtained to ascertain whether the elastomer is suitable for the present invention.

Tho elastomer chosen must also be able to adhere to the surface of the propeller and therefore its properties must be matched to a suitable intermediary substance which can bond the elastomer to the surface of a propeller. In the example given in the specification the desired intermediary substance is a silane.

One example of another polyurethane which may be used in the present invention is TU901 which is a product of Conathane.

Continuing with the mixing procedure, the next step is to decant sufficient polyurethane. Decant catalysing agent which is Ethacure 300. Catalysing agent is mixed at 10% by weight with the polyurethane. Thoroughly mix the two together. Record ambient temperature, batch number and shelf time.

Caution

Decanting of polyurethane and catalysing agent must be performed under a nitrogen shield.

Centrifuge

As soon as the polymer is mixed, place the mixture into the reservoir of the centrifuge. Then immediately spin the centrifuge for 6±1 minutes. The reason for centrifuging is to eliminate air bubbles and ensure that the mould is completely filled with polymer. Note that polymer must be seen coming up the mould vent tube, indicating that the mould is full and free from entrapped air.

Stop the centrifuge. Disconnect feed and vent fines from the reservoir and remove mould with blade from the centrifuge. At this point the polymer will have started to gel.

Curing the Polyurethane

Place the mould plus blade in a circulating air oven at 65±3° C. for 18±1 hours.

After curing, remove the mould assembly from the oven. Strip the mould from the blade. Allow mould plus blade to still air coot.

Clean the mould with ERALEASE release agent.

Finishing

After cooling, examine the moulded layer for freedom from porosity and shrinkage cracking. Cut off risers, sprues and vents and the leading edge joint flash, using a plastic sharp edge. Be very careful not to nick the aluminium propeller blade with the knife.

Peel off any edge flash or scale using finger nails or a plastic straight edge. Be sure not to mark the underlying aluminium.

Paint the blade tips as required.

Check the blade mass against the manufacturers specified maximum.

Assemble the propeller in accordance with propeller manufacturers instructions and balance propeller.

If allowable blade mass is not available, check the total mass against the maximum specified on the propeller Type Data Sheet.

Testing

Test Specimen

A test specimen shall be manufactured at the same time and using the same surface preparation, processes and materials that are used for protecting the blades when the blades are being protected. One sample will be made for each polymer mix. The samples are made in accordance with Drawing No.: PROP TEST 01

Peel Test

The test specimen shall be subjected to the peel test described in the final procedures protocol, once developed and applicable. Should this test fail, the propeller must be stripped of its protective coating and steps 2.0 to 10.0 repeated.

By providing a blade with a protective coating in the manner described above, it is possible to make a significant reduction in erosion of the erodable edges of the blade. At the same time the protective coating does not adversely affect the performance of the blade which as understood by aerodynamical engineers is subjected to extreme forces an a result of high rotational speeds.

It is preferred that the propeller with the coating applied in the above manner complies with US government code of regulations title 14 Chapter 1, Part 35 (FAR 35).

Preferably the coating is 90 duro, has good resistance to sunlight and utilises silane in the application of the coating to an aluminium propeller or equivalent aerofoil surface.

As discussed previously although there are preferred locations for application of the coating according to one embodiment the whole propeller, rotor or other aerofoil surface is encapsulated In the elastomer coating.

It is to be understood that, if any prior art publication is referred to herein, such reference does not constitute an admission that the publication forms a part of the common general knowledge in the art, in Australia or in any other country.

What is claimed is:

1. An article having an aerodynamic surface with a portion having a protective covering thereon which is adapted to provide resistance to wear, the portion including an end edge of the article, a minor forward face, and a major rearward face portion, wherein said end edge is prone to erosion from particulate matter when in use and wherein the protective covering comprises an elastomer substance which is bonded to the portion.

2. The article as claimed in claim 1 wherein the protective covering has a hardness between 85 Shore A and 80 Shore D.

3. The article as claimed in claim 2 wherein the portion comprises a minor forward face portion, an end edge portion and a major rearward face portion of the article.

4. The article as claimed in claim 3 wherein the minor forward face portion extends from the outermost 15% of the length of the forward face edge of the blade to the outermost edge of the blade.

5. The article as claimed in claim 1 wherein the minor forward face portion extends from the outermost 15% of the length of the forward face edge of the article to the outermost edge of the article.

6. The article as claimed in claim 5 wherein the edge portion extends from the forward face to the rearward face portion.

7. The article as claimed in claim 6 wherein the major rearward face portion extends along the length of a rearward edge of the article from the trailing edge to the leading edge portion.

8. The article as claimed in claim 7 wherein the end edge portion comprises approximately 6% of the major length of the article as measured from the end edge inwardly.

9. The article as claimed in claim 8 wherein the end edge portion comprises a leading edge and has a convex arcuate shape.

10. The article as claimed in claim 9 wherein the end edge portion tapers toward the front and rearward face portions.

11. The article as claimed in claim 10 wherein the elastomer substance comprises polyurethane bonded with a silane coupling agent to an aluminum surface of the article.

12. The article as claimed in claim 11 wherein the end edge portion has a radial width of 1 to 6 mm.

13. The article as claimed in claim 12 wherein the portion is part of a propeller.

14. The article as claimed in claim 13 wherein the portion excludes a major part of a top surface of the article.

15. A method of covering a portion of a metal surface comprising the steps of treating the surface of a portion with a silane coupling agent to allow bonding of a polyurethane substrate thereto, applying a polyurethane prepolymer to the treated surface of the portion and polymerising the prepolymer, whereby the polyurethane substrate is bonded to the surface of the portion.

16. The method as claimed in claim 15 where the metal surface comprises an aerodynamic surface.

17. The method as claimed in claim 16 wherein the metal surface is aluminum.

18. The method as claimed in claim 17 wherein the metal surface is the surface of a blade of one of a propeller, rotor, or impeller.

19. The method as claimed in claim 15 further including the step of placing an article having the portion in a mould, placing the mould in a centrifuge and operating the centrifuge to set the polymeric substance in the mould.

20. The method as claimed in claim 19 wherein the silane coupling agent is gammaglycidoxypropyltrimethoxysilane.

21. The method as claimed in claim 20 wherein the silane is applied as a 2% aqueous solution.

22. The method as claimed in claim 21 wherein the polyurethane substance which is bonded to the surface of the potion has a Shore hardness of between 85 Shore A and 80 Shore D.

23. The method claimed in claim 19 wherein the portion includes from 1 to 6 mm of the leading edge of the article.

24. The method as claimed in claim 23 wherein the portion includes between 0 and 0.5 mm at the trailing edge of the blade and 1 and 2 mm at the leading edge of the blade, along the rear face of the blade.

25. The method as claimed in claim 24 wherein the portion includes a section of the forward face of the blade extending inwardly from the leading edge approximately 15% of the length of the blade.

* * * * *